United States Patent [19]
Piglia et al.

[11] Patent Number: 5,664,524
[45] Date of Patent: Sep. 9, 1997

[54] PET CONTAINMENT SYSTEM

[76] Inventors: Lawrence M. Piglia; Amy D. Sileven, both of 609 N. 9th St., Apt. 2, Herrin, Ill. 62948

[21] Appl. No.: 504,134

[22] Filed: Jul. 19, 1995

[51] Int. Cl.$^6$ ............................................. A01K 1/00
[52] U.S. Cl. ............................................. 119/452
[58] Field of Search ........................ 119/452, 422, 119/417, 421, 702

[56] References Cited

U.S. PATENT DOCUMENTS

| | | | |
|---|---|---|---|
| D. 231,367 | 4/1974 | Willinger et al. | 119/452 |
| 3,859,961 | 1/1975 | Willinger et al. | 119/452 |
| 3,865,082 | 2/1975 | Lovitz et al. | 119/452 |
| 3,994,262 | 11/1976 | Sucitowski et al. | 119/452 X |
| 4,890,827 | 1/1990 | Tottey | 272/4 |
| 4,953,502 | 9/1990 | Hoover | 119/29 |
| 5,092,269 | 3/1992 | Phillips et al. | 119/452 |
| 5,095,852 | 3/1992 | Hoover | 119/29 |
| 5,186,122 | 2/1993 | Phillips et al. | 119/474 |

*Primary Examiner*—Thomas Price
*Attorney, Agent, or Firm*—Joseph N. Breaux

[57] ABSTRACT

A pet containment system of the type having interconnected module sectional units and tube sectional units forming an enclosed environment for a small animal fabricated from transparent thermoplastic material. The sectional units having a least one portal forming a female connector. A connection mechanism having at least two male connectors for interconnecting the sectional units.

20 Claims, 3 Drawing Sheets

PET CONTAINMENT SYSTEM

TECHNICAL FIELD

The present invention relates to enclosures for containing small animals that are maintained as pets and more particularly to enclosure systems for containing small animals commonly maintained as pets in an enclosed environment which may be manipulated to form various shaped and dimensioned animal enclosures.

BACKGROUND ART

Small animal enclosures have been known and used in both the home and laboratory setting for many years. Many of these enclosures provide a standard cage in which the animal is continuously housed and maintained. In others, the pet's owner has the ability to connect an assortment of sectional units and accessories, such as exercise wheels and feeders to a main enclosure sectional unit. Such a feature provides the pet owner with the ability to customize the pet's home into interesting and aesthetically pleasing configurations. This also allows the pet to move more freely through an enlarged environment and to encounter a variety of challenges to enhance exercise and well being.

A problem arises in such systems when it is desired to clean the sectional units or arrange the system into a new configuration. In these systems it is necessary to dismantle the entire system or sections thereof in order to remove or replace a single sectional unit. Thus, disrupting the pet's routine and requiring excessive time and effort on the part of the pet's owner.

It would be a benefit, therefore, to have a pet containment construction system in which sectional units may be removed without dismantling the entire system. It would be a further benefit to have a pet containment system in which the sectional units have same type connectors allowing placement throughout the containment system. It also be a benefit to have a mechanism for connecting any two sectional units.

GENERAL SUMMARY DISCUSSION OF INVENTION

It is thus an object of the invention to provide a pet containment system which is constructable in various shapes and dimensions at the choosing of the pet owner.

It is a further object of the invention to provide a pet containment system that has a connecting mechanism for interconnecting various sectional units.

It is still a further object of the invention to provide a pet containment system which allows the removal and interchanging of sectional units without requiring the dismantling of the entire system.

Accordingly, a pet containment system of the type having interconnected module sectional units and tube sectional units forming an enclosed environment for a small animal is provided. The pet containment system comprises: a plurality of sectional units having at least one portal forming a female connector, a connecting mechanism having a first and a second male connector end adapted for mating with said female connectors interconnecting the various sectional units, and a cap having a male connector end adapted for mating with said female connectors and a second enclosed end.

The sectional units are various small animal enclosures formed of hard transparent thermoplastic material. The sectional units may be formed in straight tubal sections, ells, radius turns, spiral designs and modular designs of various sizes and shapes. The various sizes and shapes allow for interconnection of sectional units forming numerous different pet containment systems. The thermoplastic material may be tinted to various degrees to provide a better appearance or to darken areas for sleeping or breeding. The sectional units must have air holes providing an adequate air supply for the contained pet. Preferably, the air holes have curved edges and are of a small diameter to prevent the contained animal from gnawing on the edges of the air hole. The sectional units may have internal traction ridges to aide the pet in maneuvering within the system.

The sectional units have at least one portal which forms a female connector having the same dimension as the female connectors of all other sectional units. The female connector has an inside diameter not less than four and one-half inches. The female connector has a rigid concentric ring having a mating surface and an interior surface and forms at least one L-shaped slot therein. Preferably, the rigid concentric ring forms three evenly spaced L-shaped slots.

The L-shaped slots have a first leg extending perpendicularly from the mating surface and a second leg extending perpendicularly from the first leg. The first legs of the L-shaped slots have an end open to the mating surface and a side open to the interior surface. The second legs of the L-shaped slots have a side open to the interior surface.

The connecting mechanism is formed of transparent thermoplastic material. The connecting mechanism may be of various lengths and shapes providing versatility in interconnecting the sectional units. The thermoplastic material may be tinted to various degrees to provide a better appearance. The connecting mechanism may have air holes to provide an adequate air supply for the contained pet. The connecting mechanism may have internal traction ridges to aide the pet in maneuvering within the system.

The connecting mechanism has a tube having a first and a second tube end forming a pathway therethrough. The pathway has an inside diameter not less than four and one-half inches to allow small animals such as ferrets and squirrels to pass. The first and second tube ends form male connectors compatible with the female connectors formed by the sectional unit portals. The first and second tube ends may have a first and a second male connector secured thereon.

The connecting mechanism may have a first flange connected to the first tube end having a neck sized for frictionally passing into a rigid concentric ring. A stud extends perpendicularly from the exterior surface of the first flange neck, the stud having dimensions permitting it to snugly pass within an L-shaped slot. Preferably, three evenly spaced studs extend from the exterior of the first flange neck.

The connecting mechanism may have a second flange connected to the second tube end having a neck sized for frictionally passing into a rigid concentric ring. A stud extends perpendicularly from the exterior surface of the second flange neck, the stud having dimensions permitting it to snugly pass within an L-shaped slot. Preferably, three evenly spaced studs extend from the exterior of the second flange neck.

Preferably, the connecting mechanism has a first flange, having a neck, connected to the first tube end and a second flange, having a neck, connected to the second tube end. Three studs, evenly spaced, extend from the exterior of both the first and the second flange neck and are compatible with the L-shaped slots.

The first flange may be rotatably connected to the first tube end and the second flange may be rigidly connected to the second tube end. The first flange may be rigidly connected to the first tube end and the second flange may be rotatably connected to the second tube end. Preferably, the first flange is rotatably connected to the first tube end and the second flange is rotatably connected to the second tube end.

The cap has a male connector end adapted for mating with a female connector and a second enclosed end. Preferably, the male connector is identical in construction as the male connector ends of the connecting mechanism.

A mechanism for hanging a toy for the animal to play with may be attached to the interior surface of the closed end of the cap to form a toy cap. The hanging mechanism may be a hook or an eyelet. Preferably, the hanging mechanism is a hook to provide easy attachment of toys.

In use the first flange neck of the connection mechanism is inserted within the rigid connection ring of a sectional unit aligning the studs within the first legs of the L-shaped slots, then rotating the flange so that the studs are disposed within the second legs of the L-shaped slots interlocking the sectional unit and the connecting mechanism. This process is repeated in relation to the second flange and another sectional unit. In this sequence numerous sectional units may be interconnected forming various configurations in which the contained pet may travel.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

Figure 1:
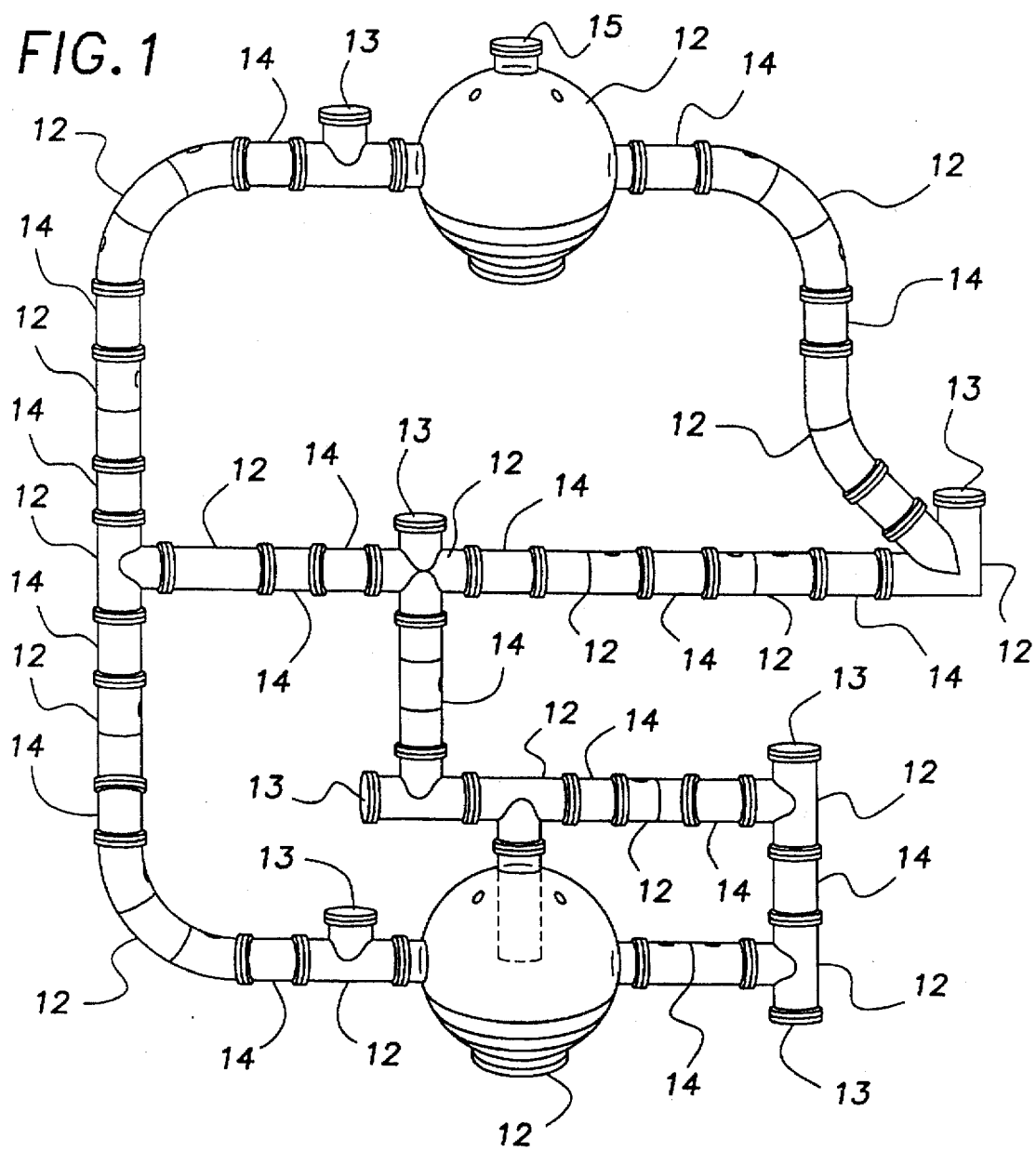
FIG. 1 is a plan view of an exemplary embodiment of the pet containment system.

FIG. 1 is a plan view of an exemplary embodiment of the pet containment system of the present invention generally designated by the numeral 10. Pet containment system 10 comprises sectional units 12 formed of a hard transparent plastic interconnected with connecting mechanisms 14, caps 13 and toy caps 15 to form a closed environment for a small animal such as a ferret.

Figure 2:
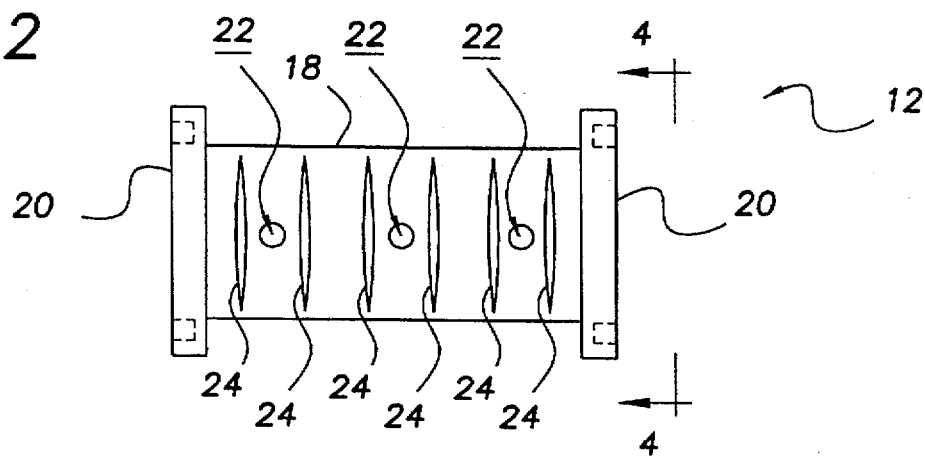
FIG. 2 is a top view of a sectional unit.

FIG. 2 is a top flew of a sectional unit 12. Sectional unit 12 includes a tube 18 ending in two portals 20 forming female connectors, air holes 22 and internal traction ridges 24. Tube 18 and portals 20 have inside diameters of four and three-quarter inches.

Figure 3:
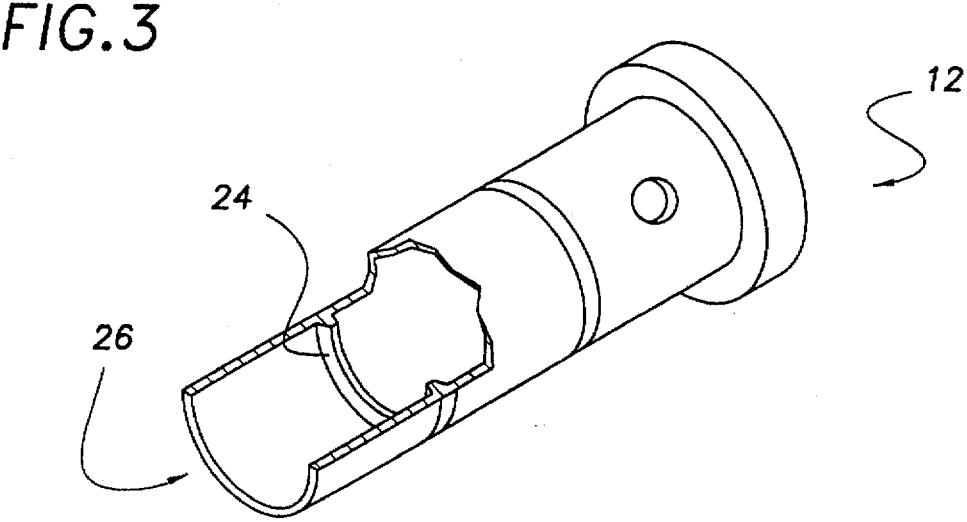
FIG. 3 is an isometric cut away view of the sectional unit of FIG. 2.

FIG. 3 is an isometric cut away view of sectional unit 12. The figure shows tube passageway 26 and an internal traction ridge 24.

Figure 4:
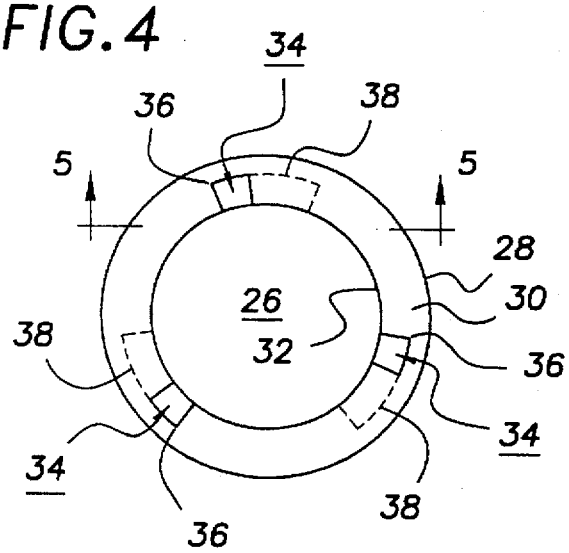
FIG. 4 is an end view of a portal along the line 4—4 shown in FIG. 2.

FIG. 4 is an end view of a portal 20 along the line 4—4 shown in FIG. 2. Portal 20 is common to all sectional units 12 and all portals 20 have the same dimensions. The figure shows a rind concentric ring 28 having a mating surface 30 and an interior surface 32, passageway 26 and three L-shaped slots 34 formed into concentric ring 28. Each L-shaped slot 34 has a first leg 36 extending perpendicularly from mating surface 30 and an end open to mating surface 30. Each L-shaped slot 34 has a second leg 38, represented by the dotted line, extending perpendicularly from first leg 36.

Figure 5:
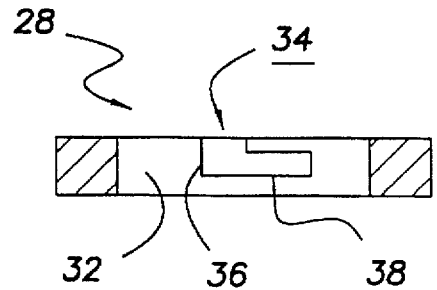
FIG. 5 is a cross-sectional view of a concentric ring along the line 5—5 shown in FIG. 4.

FIG. 5 is a cross-sectional view of the concentric ring 28 along the line 5—5 shown in FIG. 4. The figure shows an L-shaped slot 34 and interior surface 32. A side of first leg 36 and a side of second leg 38 is open to interior surface 32.

Figure 6:
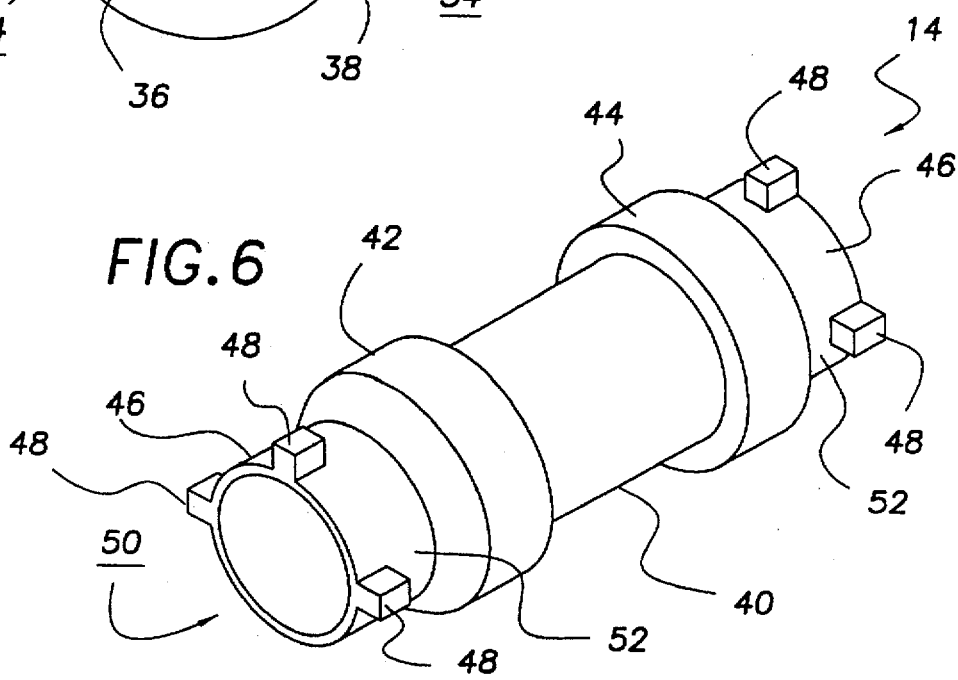
FIG. 6 is an isometric view of a connecting mechanism.

FIG. 6 is an isometric flew of a connecting mechanism 14. Connecting mechanism 14 is formed of a hard transparent plastic. The figure shows a tube 40, and male connectors comprising a first and a second flange 42,44, necks 46 and studs 48 which are adapted for mating with the female connectors of sectional units 12 (FIG. 1).

Connecting mechanism 14 forms a passageway 50 therethrough having an inside diameter of four and one-half inches. First and second flange 42,44 are rotatably connected to tube 40. Necks 46 are sized to frictionally pass within concentric ring 28 (FIG. 4). Studs 48 are rectangularly shaped and extend perpendicularly from exterior surfaces 52 of necks 46. Studs 48 are sized to slidably pass within L-shaped slots 34 (FIG. 4).

Figure 7:
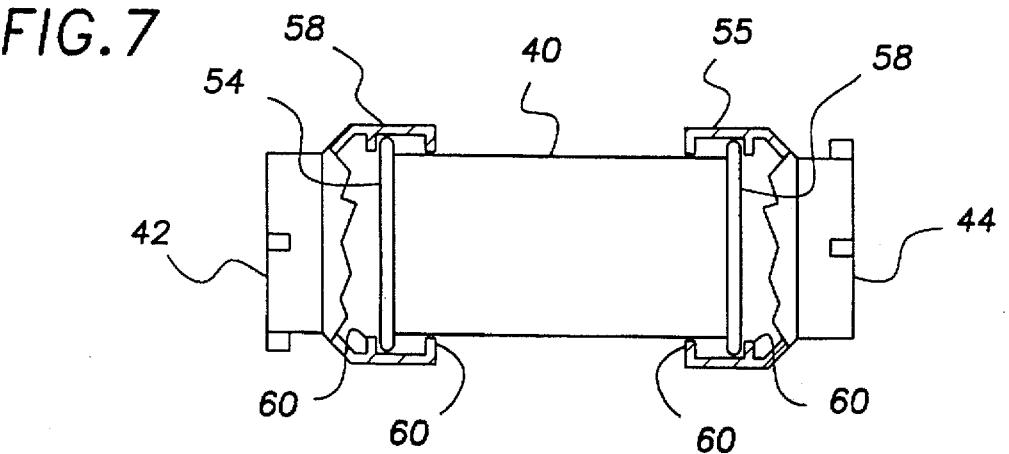
FIG. 7 is a cut away side view of a connecting mechanism.

FIG. 7 is a cut away side view of a connecting mechanism 14. The figure shows a first and a second tube end 54,56 having lips 58 formed thereon and internal flange ribs 60. Internal flange ribs 60 entrap lip 58 rotatably connecting first and second flange 49,44 to tube 40.

Figure 8:
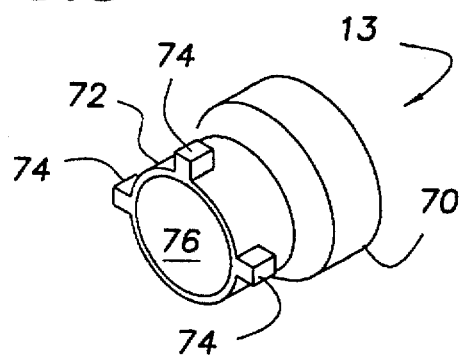
FIG. 8 is an isometric view of a cap from the open end.

FIG. 8 is an isometric view of a cap 13. The figure shows a flange 70, a neck 72 and studs 74 extending from neck 72. Flange 70 and neck 79, define a cavity 76. Flange 70, neck 72 and studs 74 comprise a male connector having the same dimensions as the male connectors shown in FIG. 6.

Figure 9:
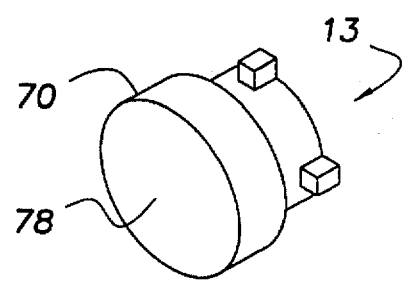
FIG. 9 is an isometric view of a cap from the closed end.

FIG. 9 is an isometric view of a cap 13 from the opposite side of that shown in FIG. 8. The figure shows a planar plug 78 connected to flange 70 to form a closed end to cap 13.

Figure 10:
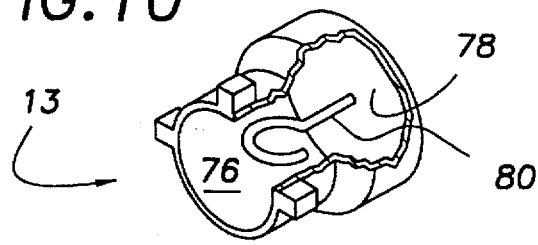
FIG. 10 is a cut away isometric view of a cap.

FIG. 10 is a cut away isometric view of a toy cap 15. Toy cap 15 has the same dimension and construction as cap 13 (FIGS. 8,9). The figure shows a hook 80 connected to planar plug 78 and disposed within cavity 76. Hook 80 provides a mechanism for attaching a toy (not shown) for a contained animal to play.

Figure 11:
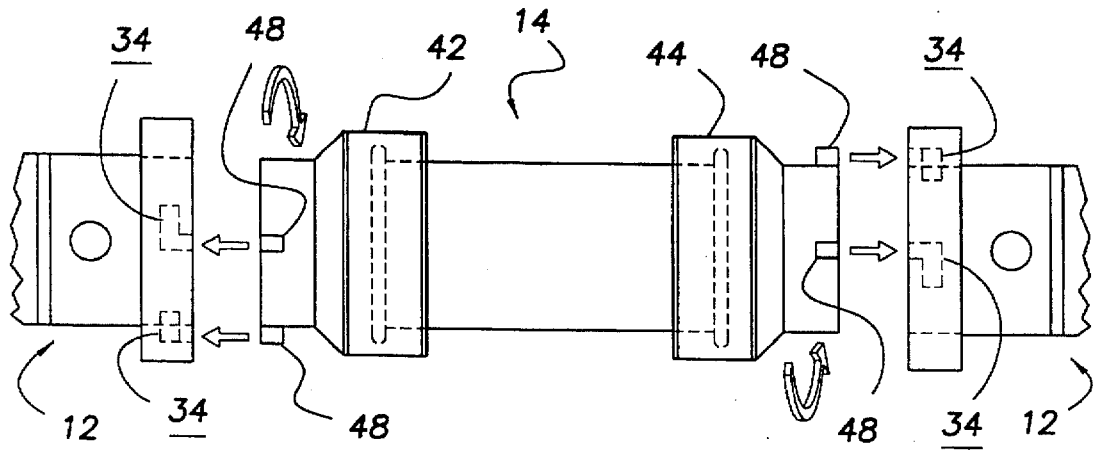
FIG. 11 is a side view of the connecting mechanism and sectional units.

FIG. 11 is a side view of a connecting mechanism 14 and sectional units 12. Studs 48 slidably pass into L-shaped slots 34, represented by the dotted lines, and rotation of first and second flanges 42,44 interconnects sectional units 12 and connecting mechanism 14.

It can be seen from the preceding description that a device for maintaining a pet in an enclosed containment system which allows the system to be altered in size and shape and which allows for sectional units to be removed for cleaning or replaced with other sectional units without dismantling the system has been provided.

It is noted that the embodiment of the pet containment system described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A pet containment system of the type having interconnected module sectional units and tube sectional units forming an enclosed environment for a small animal, said pet containment system comprising:

a plurality of sectional units having at least one portal forming a female connector;

said female connector includes a rigid concentric ring having a mating surface and an interior surface, said rigid concentric ring forming an L-shaped slot therein;

said L-shaped slot having a first leg extending perpendicularly from said mating surface and a second leg extending perpendicularly from said first leg;

a connecting mechanism having a first and second male connector end, each said first and said second male connector end including a locking stud that is positionable in engaging connection with said L-shaped slot of said female connectors interconnecting said sectional units; and a cap having a closed end and a third male connector end, said third male connector end including a locking stud that is positionable in engaging connection with said L-shaped slot of said female connectors.

2. The pet containment system of claim 1, wherein:

said sectional units are constructed of a transparent material; and said connecting mechanism is constructed of a transparent material.

3. The pet containment system of claim 2, wherein:

said sectional units are formed of a hard plastic; and said connecting mechanism is formed of a hard plastic.

4. The pet containment system of claim 3, wherein:

said first leg of said L-shaped slot has an end open to said mating surface.

5. The pet containment system of claim 3, wherein:

said first leg of said L-shaped slot has an end open to said mating surface and a side open to said interior surface; and said second leg of said L-shaped slot has a side open to said interior surface.

6. The pet containment system of claim 5, wherein:

said connecting mechanism includes:

a tube having a first and a second tube end forming a pathway therethrough;

a first flange connected to said first tube end having a neck positionable within said rigid concentric ring; and a second flange connected to said second tube end having a neck positionable within said rigid concentric ring.

7. The pet containment system of claim 6, wherein:

a said locking stud extends perpendicularly from an exterior surface of said first flange neck, said locking stud being slidably disposable within said L-shaped slot; and a said locking stud extends perpendicularly from an exterior surface of said second flange neck, said locking stud being slidably disposable within said L-shaped slot.

8. The pet containment system of claim 7, wherein:

said first flange is rotatably connected to said first tube end; and said second flange is rotatably connected to said second tube end.

9. The pet containment system of claim 8, further including:

a toy cap having a closed end and a fourth male connector end, said fourth male connector end including a locking stud positionable in engaging connection with said L-shaped slot of said female connectors, said toy cap having a means for hanging a toy for a small animal to play within said pet containment system.

10. The pet containment system of claim 9, wherein:

said portal of said sectional unit has a inside diameter not less than four and one half inches; and said connecting mechanism has an inside diameter not less than four and one half inches.

11. A pet containment system of the type having interconnected module sectional units and tube sectional units forming an enclosed environment for a small animal, said pet containment system comprising:

a plurality of sectional units having at least one portal forming a female connector;

said female connector includes a rigid concentric ring having a mating surface and an interior surface, said rigid concentric ring forming three L-shaped slots therein;

said L-shaped slots having a first leg extending perpendicularly from said mating surface and a second leg extending perpendicularly from said first leg;

said first leg having an end open to said mating surface and a side open to said interior surface and said second leg having a side open to said interior surface;

a connecting mechanism having a first and second male connector end, each said first and said second male connector end including a locking stud that is positionable in engaging connection with said L-shaped slot of said female connectors interconnecting said sectional units; and a cap having a closed end and a third male connector end, said third male connector end including a locking stud that is positionable in engaging connection with said L-shaped slot of said female connectors.

12. The pet containment system of claim 11, wherein:

said connecting mechanism includes:

a tube having a first and a second tube end forming a pathway therethrough;

a first flange connected to said first tube end having a neck positionable within said rigid concentric ring; and a second flange connected to said second tube end having a neck positionable within said rigid concentric ring.

13. The pet containment system of claim 12, wherein:

said connecting mechanism includes:

three said locking studs extending perpendicularly from an exterior surface of said first flange neck, said locking studs being slidably disposable within said L-shaped slots; and three said locking studs extending perpendicularly from an exterior surface of said second flange neck, said locking studs being slidably disposable within said L-shaped slots.

14. The pet containment system of claim 13, wherein:

said sectional units are constructed of a transparent material; and said connecting mechanism is constructed of a transparent material.

15. The pet containment system of claim 14, wherein:

said sectional units are formed of a hard plastic; and said connecting mechanism is formed of a hard plastic.

16. The pet containment system of claim 15, wherein:

said first flange is rotatably connected to said first tube end; and said second flange is rotatably connected to said second tube end.

17. The pet containment system of claim 16, further including:

a toy cap having a closed end and a fourth male connector end, said fourth male connector end including a locking stud positionable in engaging connection with said L-shaped slot of said female connectors, said toy cap having a means for hanging a toy for a small animal to play within said pet containment system.

18. The pet containment system of claim 17, wherein:

said portal of said sectional unit has an inside diameter not less than four and one half inches; and said connecting means has an inside diameter not less than four and one half inches.

19. The pet containment system of claim 18, wherein:

said toy cap is made of a hard transparent material.

20. A pet containment system of the type having interconnected module sectional units and tube sectional units forming an enclosed environment for a small animal, said pet containment system comprising:

a plurality of sectional units formed of a hard transparent plastic having at least one portal forming a female connector;

said portal having an inside diameter of not less than four and one half inches;

said female connector includes a rigid concentric ring having a mating surface and an interior surface, said rigid concentric ring forming three L-shaped slots therein;

said L-shaped slots having a first leg extending perpendicularly from said mating surface and a second leg extending perpendicularly from said first leg;

said first leg having an end open to said mating surface and a side open to said interior surface and said second leg having a side open to said interior surface;

a cap having a closed end and a third male connector end, said third male connector end including a locking stud that is positionable in engaging connection with said L-shaped slot of said female connectors;

a toy cap having a closed end and a fourth male connector end, said fourth male connector end including a said locking stud that is positionable in engaging connection with said L-shaped slot of said female connectors;

said toy cap having a means for hanging a toy for a small animal to play within said pet containment system; and a connecting mechanism having a first and second male connector end, said connecting mechanism comprising:

a tube having a first and a second tube end forming a pathway having an inside diameter not less than four and one half inches therethrough;

a first flange rotatably connected to said first tube end having a neck positionable within said rigid concentric ring;

a second flange rotatably connected to said second tube end having a neck positionable within said rigid concentric ring;

three said locking studs extending perpendicularly from an exterior surface of said first flange neck, said locking studs being slidably disposable within said L-shaped slots; and three said locking studs extending perpendicularly from an exterior surface of said second flange neck, said locking studs being slidably disposable within said L-shaped slots.

* * * * *